(12) United States Patent
Gruschko et al.

(10) Patent No.: US 10,089,034 B2
(45) Date of Patent: Oct. 2, 2018

(54) WRITE ORDER PRESERVING DATA STREAM CONSUMPTION

(71) Applicant: SAP SE, Walldorf (DE)

(72) Inventors: Boris Gruschko, Ziegelhausen (DE); Christian Mohr, Heidelberg (DE); Martin Strenge, Nussloch (DE); Florian Foebel, Buerstadt (DE); Bjoern Friedmann, Rheinmuenster (DE)

(73) Assignee: SAP SE, Walldorf (DE)

( * ) Notice: Subject to any disclaimer, the term of this patent is extended or adjusted under 35 U.S.C. 154(b) by 170 days.

(21) Appl. No.: 15/203,410

(22) Filed: Jul. 6, 2016

(65) Prior Publication Data

US 2018/0011658 A1 Jan. 11, 2018

(51) Int. Cl.
G06F 3/06 (2006.01)
H04L 29/06 (2006.01)
H04L 29/08 (2006.01)

(52) U.S. Cl.
CPC .......... *G06F 3/0644* (2013.01); *G06F 3/0604* (2013.01); *G06F 3/067* (2013.01); *H04L 67/1097* (2013.01); *H04L 67/42* (2013.01)

(58) Field of Classification Search
CPC ...... G06F 3/0644; G06F 3/0604; G06F 3/067; H04L 67/1097; H04L 67/42
See application file for complete search history.

(56) References Cited

U.S. PATENT DOCUMENTS 7,440,955 B2 * 10/2008 Khandelwal ...... G06F 17/30675
2015/0312179 A1 * 10/2015 Ben-Ezra .............. H04L 51/043
709/203

OTHER PUBLICATIONS

Kreps et al., "Kafka: a Distributed Messaging System for Log Processing", NetDB'11, Jun. 12, 2011, Athens, Greece, ACM.*
Sookocheff, "Kafka in a Nutshell", https://sookocheff.com/post/kafka/kafka-in-a-nutshell/, Sep. 25, 2015.*

* cited by examiner

*Primary Examiner* — Brian J Gillis
*Assistant Examiner* — Amy Ling
(74) *Attorney, Agent, or Firm* — Mintz, Levin, Cohn, Ferris, Glovsky & Popeo, P.C.

(57) ABSTRACT

A system, a method, and a computer program product for scalable processes for write-order preserving data stream consumption. A data partition in a plurality of data partitions of data stream is selected based on a request received from a client processing node. The plurality of data partitions are distributed among a plurality of broker nodes in a distributed messaging system. A broker node in the plurality of broker nodes hosting the selected data partition is identified. The identified broker node provides the selected data partition to the client processing node for performing at least one function.

17 Claims, 9 Drawing Sheets

WRITE ORDER PRESERVING DATA STREAM CONSUMPTION

TECHNICAL FIELD

This disclosure relates generally to data processing and, in particular, to scalable processes for write-order preserving data stream consumption.

BACKGROUND

Modern computing systems are typically tasked with solving large computational problems, such as effectively processing large amounts of data. To do so, such systems operate in a distributed system environment. A distributed computing system includes components or nodes that may be located on networked computers, which can communicate and/or coordinate with one another by exchanging messages in order to achieve a common goal. Distributed computing systems are typically characterized by concurrency of components, lack of a global clock, and independent failure of components.

In distributed systems, data can be written to and read from data streams representing an ordered sequence of messages, where data can be distributed among many different computing locations. Distributed systems typically preserve an order of in which data is written to data streams, so that it can be read in the same order. However, conventional distributed computing systems do not provide scalability while preserving message order, especially, when large numbers of reader and/or writer clients are attempting to interact with the system as well as the amount of data to be managed.

SUMMARY

In some implementations, the current subject matter relates to a computer implemented method for scalable processes for write-order preserving data stream consumption. The method can include selecting a data partition in a plurality of data partitions of data stream based on a request received from a client processing node, the plurality of data partitions are distributed among a plurality of broker nodes in a distributed messaging system, identifying a broker node in the plurality of broker nodes hosting the selected data partition, and providing, by the identified broker node, the selected data partition to the client processing node for performing at least one function. At least one of the selecting, the identifying, and the providing can be performed by at least one processor of at least one computing system.

In some implementations, the current subject matter can include one or more of the following optional features. The plurality of data partitions in the data stream can be arranged using a rooted acyclic directed graph.

In some implementations, the client processing node can includes at least one of the following: a reader processing node and a writer processing node. The reader processing node can read data from the selected data partition. The writer processing node can write data to the selected data partition.

In some implementations, the identification of the broker node can include communicating the request received from the client processing node to any broker node in the plurality of broker nodes, determining that the broker node receiving the request does not host the selected data partition, and identifying the broker node hosting the selected data partition.

In some implementations, providing of the selected partition can include providing, by the identified broker node, the selected data partition, where the selected data partition is an existing data partition in the data stream. Alternatively, the identified broker node can create a new data partition and provide the created data partition to the client processing node for performing the at least one function.

In some implementations, the function can include at least one of the following: reading data from the selected data partition and writing data to the selected data partition. In some implementations, data can be read from the selected data partition in accordance with an order in which data was written to the selected data partition.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address the deficiencies of currently available solutions, one or more implementations of the current subject matter provide for scalable processes for write-order preserving data stream consumption in distributed messaging systems.

Figure 1:
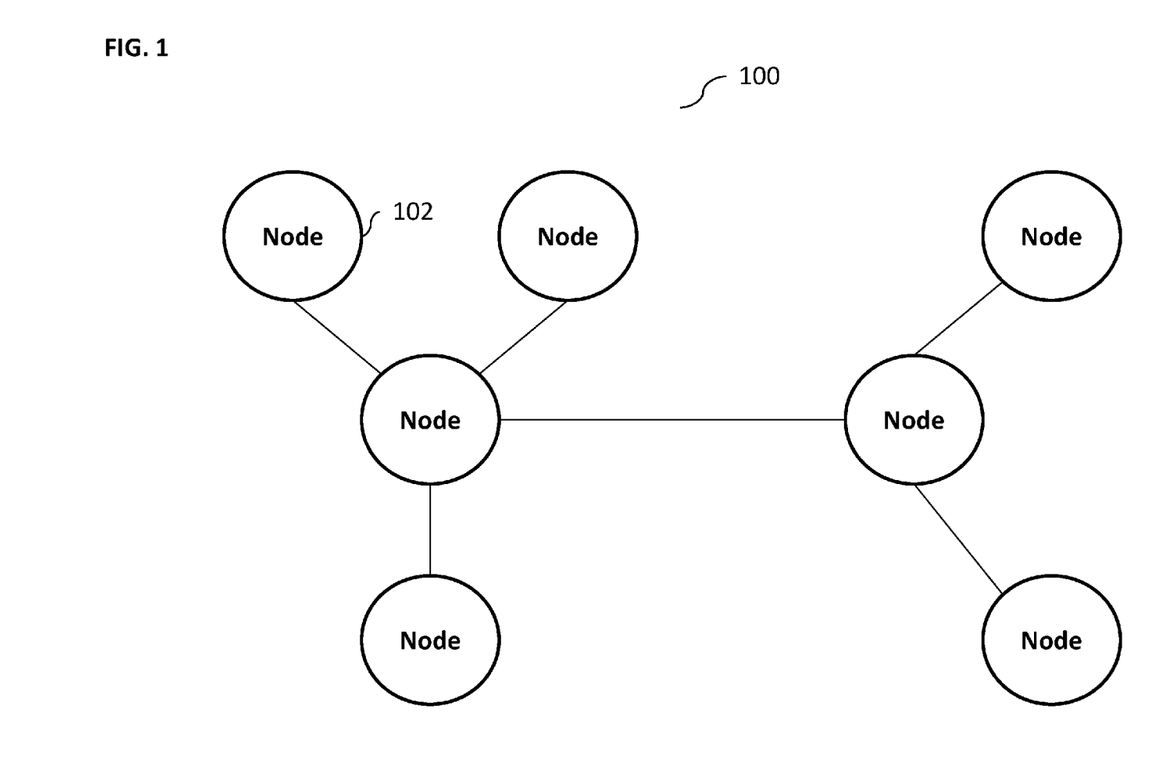
FIG. 1 illustrates an exemplary distributed messaging system.

FIG. 1 illustrates an exemplary distributed messaging system 100. The system 100 can include a plurality of computing nodes that can be communicatively coupled with one another and can process data streams. An example of a distributed message system is Apache Kafka, as developed by Apache Software Foundation, Forest Hill, Md., USA. In distributed messaging systems data can be written to and/or read from data streams, which can represent an ordered sequence of messages. Such data streams can be also referred to as feeds, topics and/or transactions. The data can be distributed across physical locations, e.g., on different computing terminals, servers, databases, etc. in a network, and/or managed by separate processes. A physical and/or logical unit that can have a specific role in the distributed messaging system can be referred to as a node of the distributed messaging system. As shown in FIG. 1, the distributed messaging system 100 can include a plurality of nodes 102. Further, nodes belonging to an instance of the distributed messaging system can be referred to as a cluster.

In the distributed messaging system, one or more processes, referred to as writers or producers, can write or publish data to a data stream. One or more processes, referred to as readers or consumers, can read data (be subscribed to and process the feed of published messages) from a data stream. Readers and writers can be both referred to as clients. In order to perform read and/or write operations, clients exchange messages with the distributed messaging system.

Figure 2:
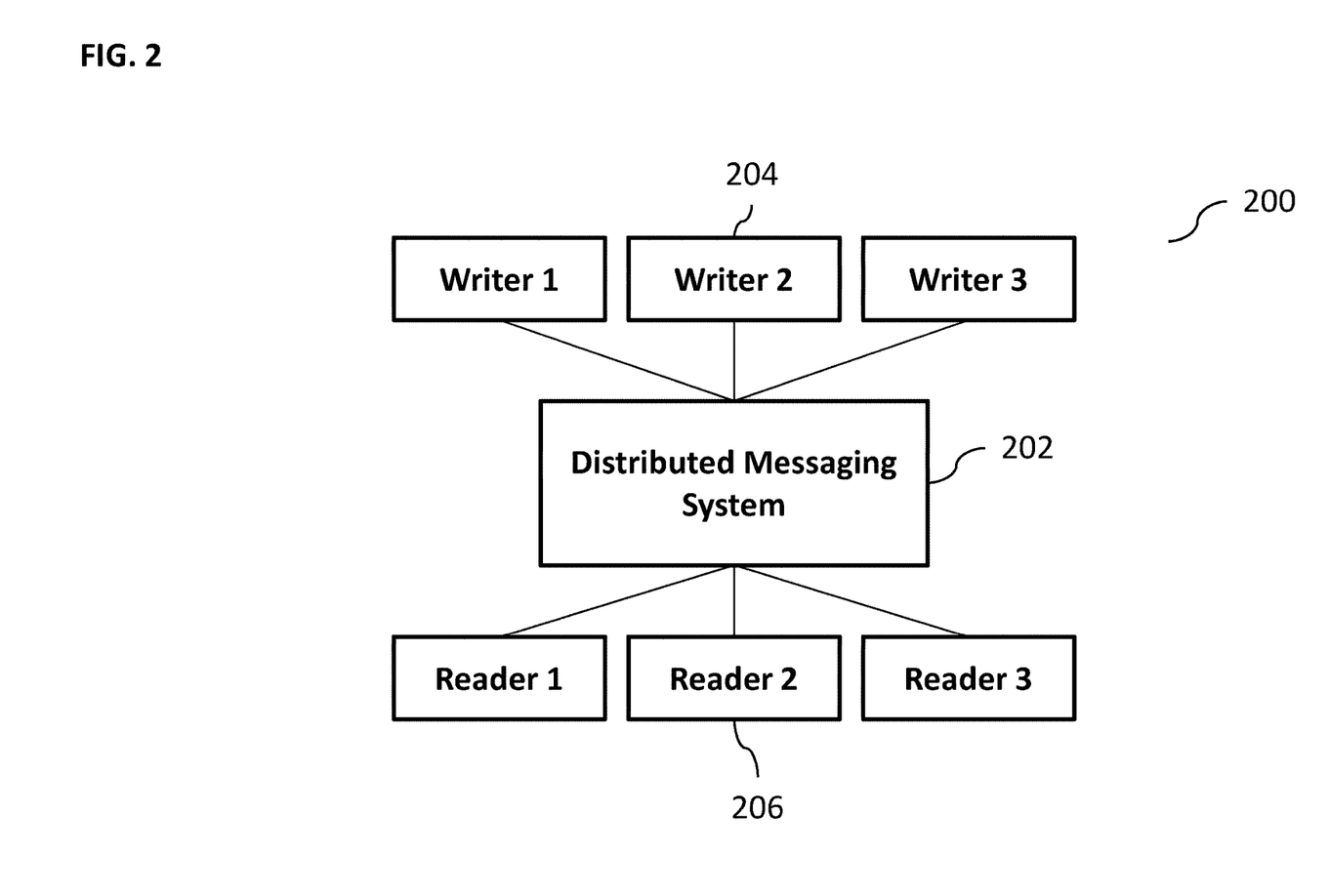
FIG. 2 illustrates an exemplary system having a plurality of writers and a plurality of readers.

FIG. 2 illustrates an exemplary system 200. The system 200 can include a plurality of writers 1-3 204 and a plurality of readers 1-3 206. The writers 204 and readers 206 can be communicatively coupled to the distributed messaging system 202. The communications between the clients 204, 206 and the system 202 can be accomplished using a high-performance, language agnostic transmission control protocol ("TCP"). A distributed messaging system can often guarantee to preserve an order in which data is written to a data stream, which means that readers will receive messages in a data stream in the same order that they were written to the stream by a writer.

Figure 3:
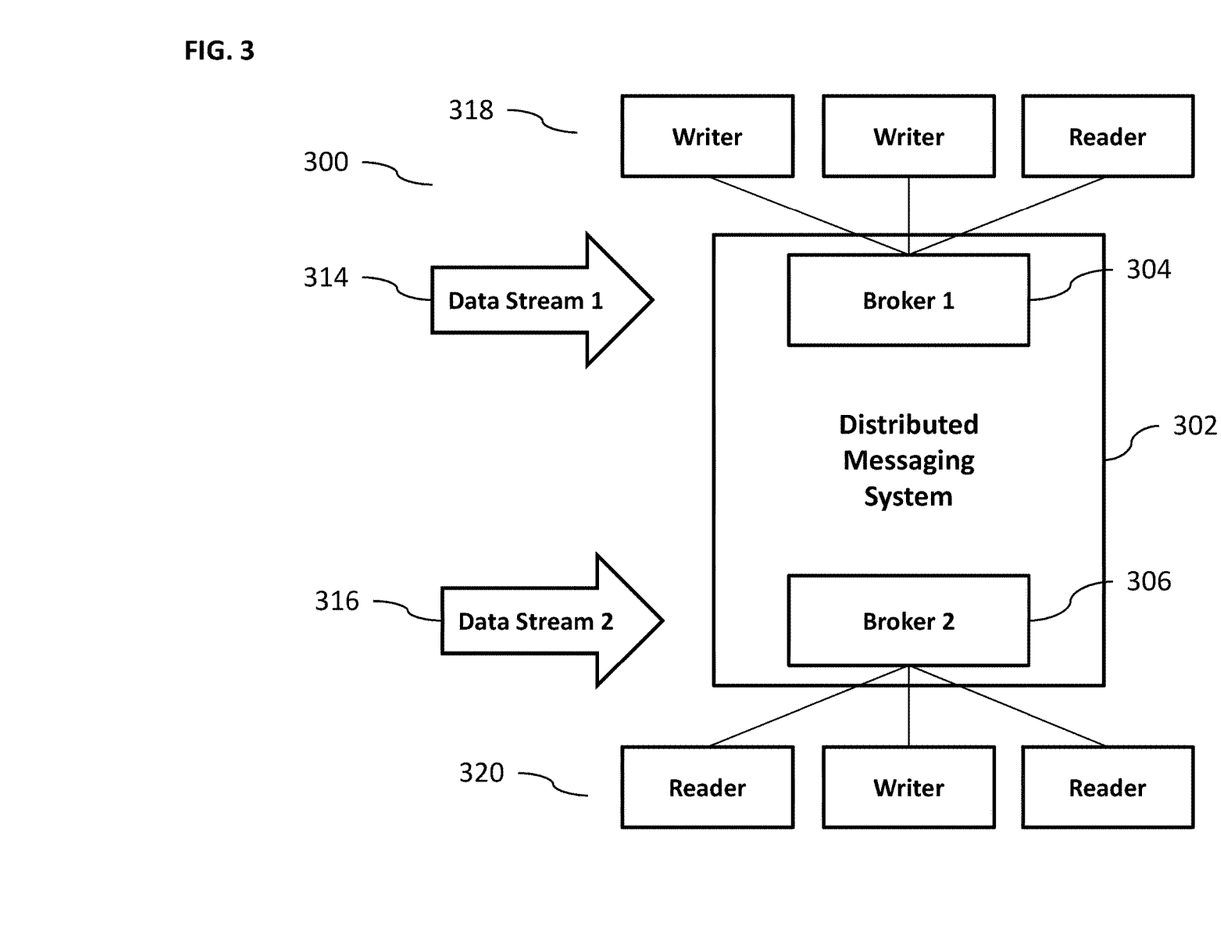
FIG. 3 illustrates an exemplary computing system including a distributed messaging system, according to some implementation of the current subject matter.

FIG. 3 illustrates an exemplary computing system 300 including a distributed messaging system, according to some implementation of the current subject matter. The system 300 can include a distributed messaging system 302, a plurality of clients 318, 320 (e.g., readers, writers), and brokers 304, 306. The distributed messaging system 302 can include brokers or multiple processes 304, 306. Each broker 304, 306 can communicate with clients 318, 320 (readers and writers) and can be responsible for processing a set of data streams. For example, as shown in FIG. 3, the broker 304 can be assigned to process data stream 314 and can be responsible for communicating with clients 318 (two writers and one reader); the broker 306 can be assigned to process data stream 316 and can be responsible for communicating with clients 320 (two readers and one writer). Data streams 314, 316 can be assigned to brokers using a variety of ways, utilizing different strategies, etc. In case, an assigned broker is defective and/or becomes defective at system runtime, the assignment of brokers can be altered.

Figure 4:
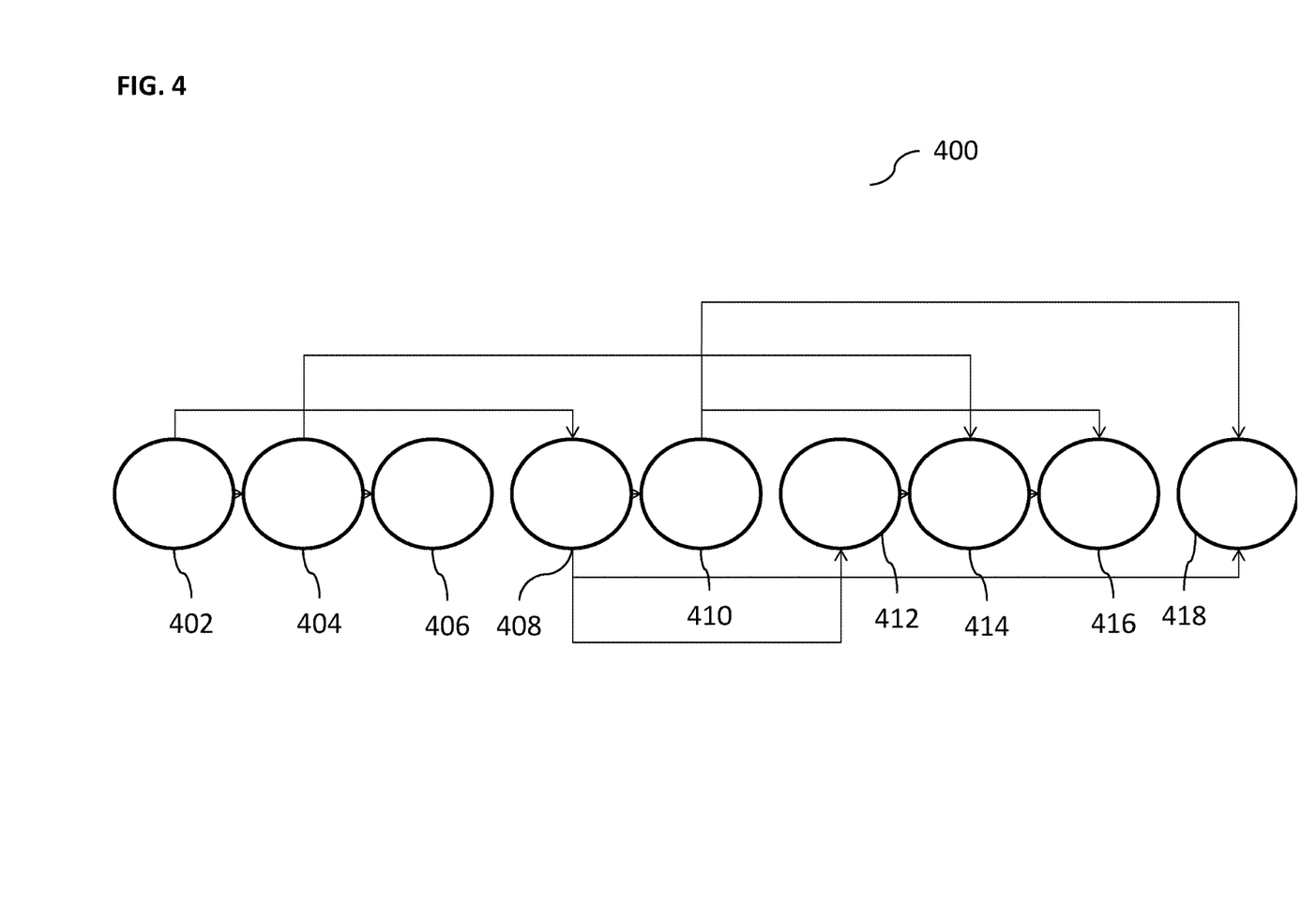
FIG. 4 illustrates an exemplary acyclic directed graph.

A data stream can be subdivided into a rooted acyclic directed graph of partitions. FIG. 4 illustrates an exemplary acyclic directed graph 400. An acyclic directed graph can be a finite directed graph without directed cycles. The graph can consist of finitely many vertices and edges. Each edge is directed from one vertex to another, such that there is no way to start at a vertex and follow a consistently-directed sequence of edges that eventually loops back to the same vertex again. The graph 400 can include a plurality of vertexes 402-418 connected by edges (shown as arrows). For example, vertex 402 can be connected to the vertex 404 and vertex 408; vertex 404 can be connected to vertex 406 and vertex 414; and so on. A vertex and/or collection of vertexes can represent a partition of data.

Figure 5:
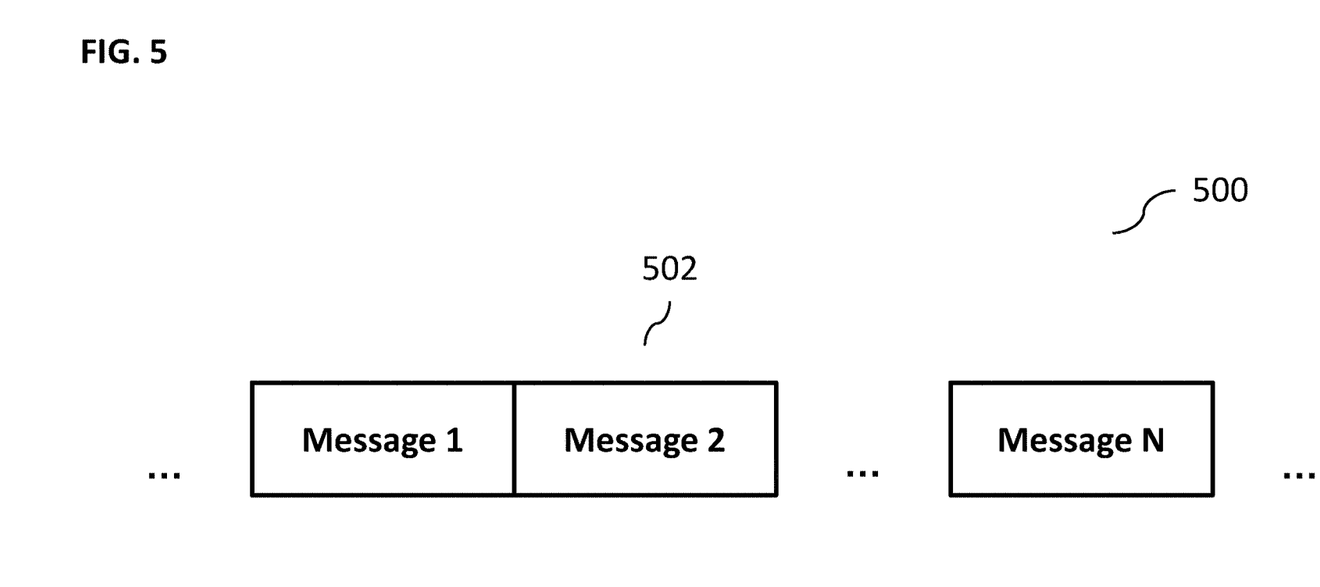
FIG. 5 illustrates an exemplary partition containing an ordered sequence of messages.

Each partition can represent an ordered sequence of messages in a data stream. FIG. 5 illustrates an exemplary partition 500 containing an ordered sequence of messages 1, 2, ... N 502. For each writer, exactly one path starting exists, which can start at the root and can represent partitions that the writer wrote to. This constraint can be enforced by a broker when assigning partitions to writers, e.g., by ensuring that the distance between the next assigned partition and the root is greater than the distance between any previously assigned partition and the root.

The partitions of a data stream can be distributed across brokers in the distributed messaging system. Information about existing data streams and the structure of their partition graph can be maintained by the responsible assigned broker and stored persistently to allow other brokers to take over management if it becomes necessary (e.g., in the event of a failover).

Figure 6:
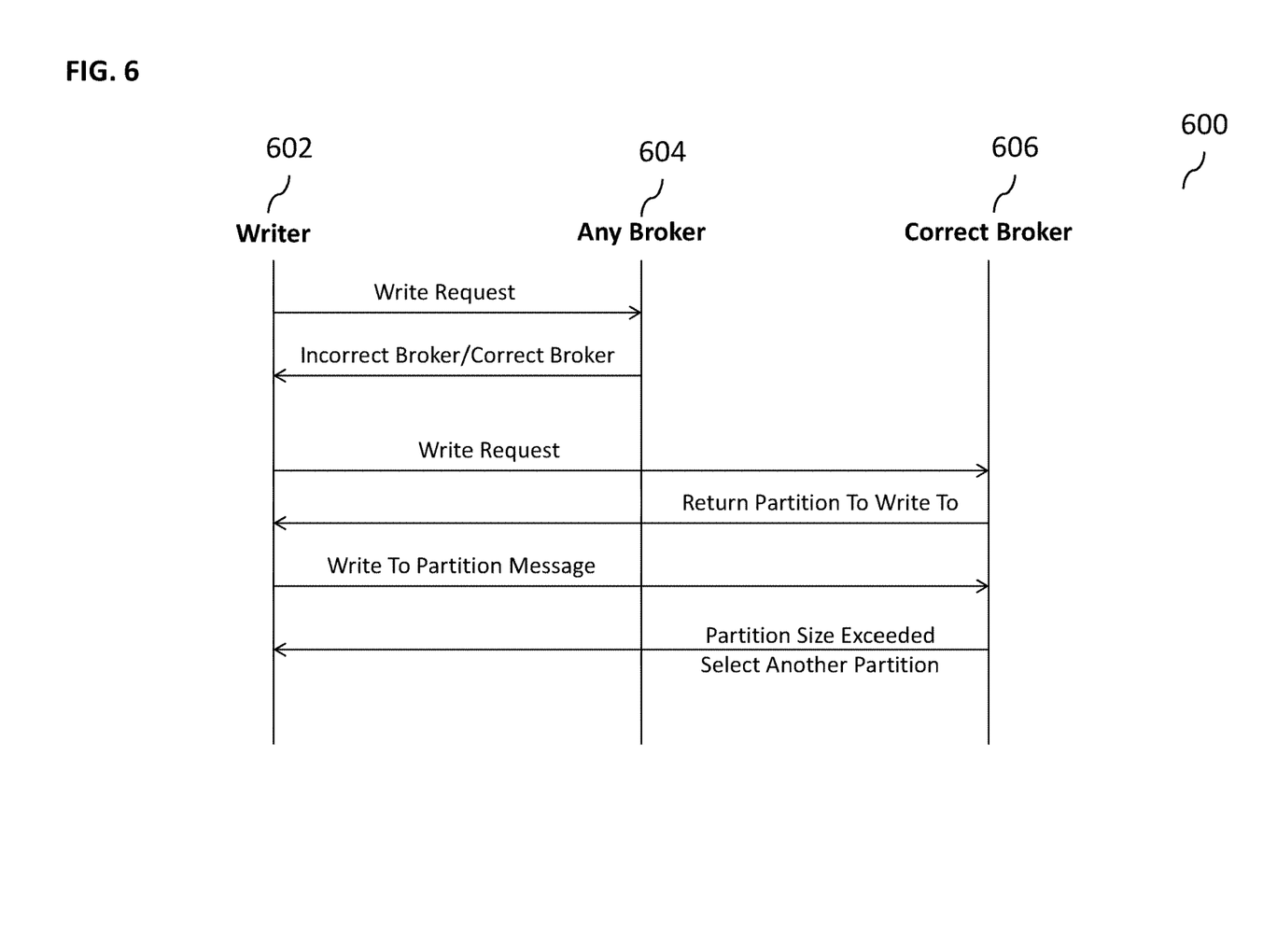
FIG. 6 illustrates an exemplary process for writing data to a data stream using the distributed messaging system shown in FIG. 3, according to some implementations of the current subject matter.

FIG. 6 illustrates an exemplary process 600 for writing data to a data stream using the distributed messaging system shown in FIG. 3, according to some implementations of the current subject matter. The process 600 can be performed by the writer 602 and brokers 604, 606. There can be more than one broker that can be involved in this process. The writer 602 can generate and transmit a write request to any given broker 604 in the distributed messaging system. The write request message can indicate writer's intent to write to a particular data stream. The system can determine whether the broker is responsible and/or has been assigned to process that particular data stream. In the event that the writer did not address the broker responsible for that data stream (i.e., the broker is not responsible and/or has not been assigned to that data stream), the writer 602 can receive a response message from the broker 604 indicating that the broker 604 is not the correct broker and advising the writer 602 to contact another broker 606 with this request. In some implementations, the broker 604 can automatically redirect the writer 602 to responsible broker 606. Once the broker responsible for the data stream has been contacted the broker can return the partition that the writer should write to. The data returned by the broker can include a location of the broker hosting the partition.

Then, the writer 602 can write to the partition by sending messages to the broker 606, which is hosting the partition. In some cases, the partition can have a predetermined size limit, which can prevent writing of further messages once the size has been exceeded. If the size of the partition is exceeded, the broker 606 can transmit a message to the writer 602 indicating that writing to the target partition may not be possible and messages should be written so another partition. Then, the writer 602 can contact another responsible broker to find out which partition the writer 602 should be writing to.

Figure 7:
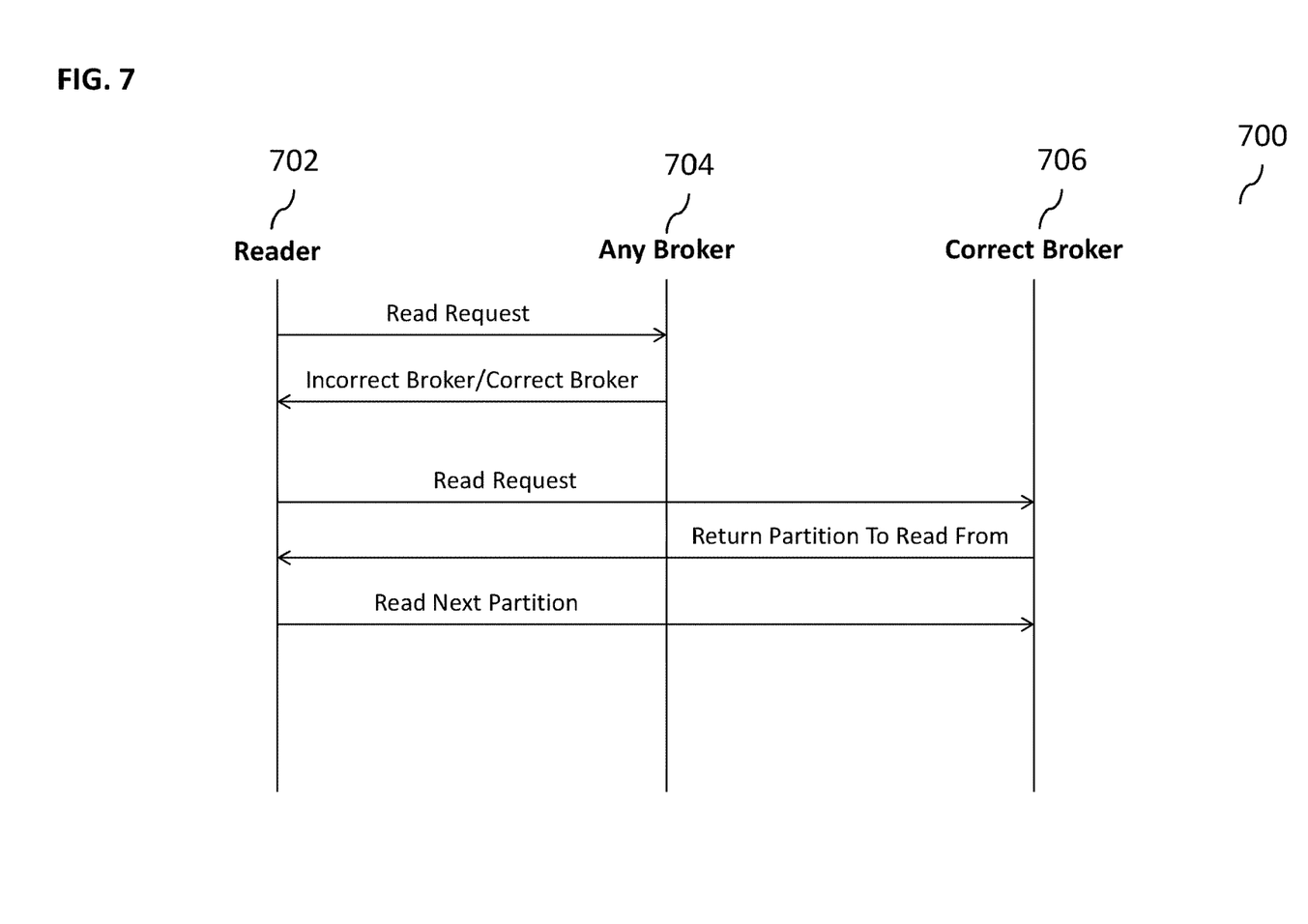
FIG. 7 illustrates an exemplary process for reading data from a data stream using the distributed messaging system shown in FIG. 3, according to some implementations of the current subject matter.

FIG. 7 illustrates an exemplary process 700 for reading data from a data stream using the distributed messaging system shown in FIG. 3, according to some implementations of the current subject matter. The process 700 can be performed by a reader 702 and brokers 704, 706. There can be more than one broker that can be involved in this process. The reader 702 can generate and transmit a read request to any given broker 704 in the distributed messaging system. The read request message can indicate reader's desire to read from a particular data stream. The system can determine whether the broker is responsible and/or has been assigned to process that particular data stream. In the event that the reader 702 did not address the broker responsible for that data stream (i.e., the broker is not responsible and/or has not been assigned to that data stream), the reader 702 can receive a response message from the broker 704 indicating that the broker 704 is not the correct broker and advising the writer 702 to contact another broker 706 with this read request. In some implementations, the broker 704 can automatically redirect the reader 702 to the responsible broker 706. Once the broker responsible for the data stream has been contacted, the broker can return the partition that the reader requested. The data returned by the broker can include a location of the broker hosting the partition. After the complete partition has been read, the reader 702 can contact the broker again to obtain the next partition to read from. The process 700 can be repeated depending on the broker that the reader as contacted.

In some implementations, the current subject matter system can create partitions dynamically. Each time a writer requests a target partition to write to, the responsible broker can determine whether to create a new partition and/or to choose an existing partition (which might potentially be in use by other writers).

Since the partitions are structured in a directed acyclic graph, the current subject mater system can ensure that readers will read messages of each writer in the exact same order they have been written to the stream. The dynamic creation of partitions can be transparent for the readers and/or writers and can make the current subject matter system highly scalable. This can be due to the fact that many writers and/or readers can, in parallel, access many partitions in the same data stream. Since the partitions are distributed across the cluster, there is an inherent load balancing for read and/or write requests.

Figure 8:
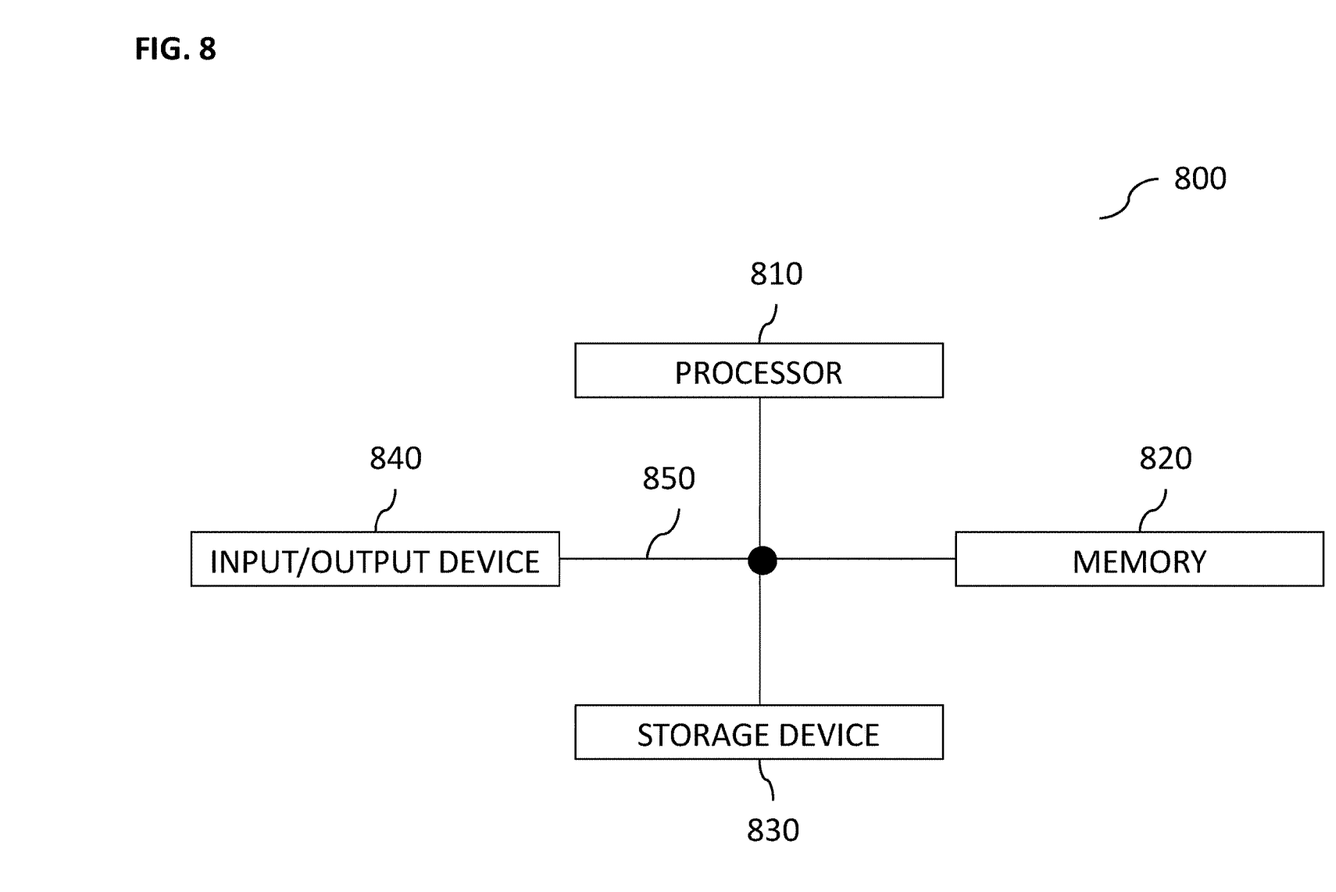
FIG. 8 illustrates an exemplary system, according to some implementations of the current subject matter.

In some implementations, the current subject matter can be configured to be implemented in a system 800, as shown in FIG. 8. The system 800 can include a processor 810, a memory 820, a storage device 830, and an input/output device 840. Each of the components 810, 820, 830 and 840 can be interconnected using a system bus 850. The processor 810 can be configured to process instructions for execution within the system 800. In some implementations, the processor 810 can be a single-threaded processor. In alternate implementations, the processor 810 can be a multi-threaded processor. The processor 810 can be further configured to process instructions stored in the memory 820 or on the storage device 830, including receiving or sending information through the input/output device 840. The memory 820 can store information within the system 800. In some implementations, the memory 820 can be a computer-readable medium. In alternate implementations, the memory 820 can be a volatile memory unit. In yet some implementations, the memory 820 can be a non-volatile memory unit.

The storage device 830 can be capable of providing mass storage for the system 800. In some implementations, the storage device 830 can be a computer-readable medium. In alternate implementations, the storage device 830 can be a floppy disk device, a hard disk device, an optical disk device, a tape device, non-volatile solid state memory, or any other type of storage device. The input/output device 840 can be configured to provide input/output operations for the system 800. In some implementations, the input/output device 840 can include a keyboard and/or pointing device. In alternate implementations, the input/output device 840 can include a display unit for displaying graphical user interfaces.

Figure 9:
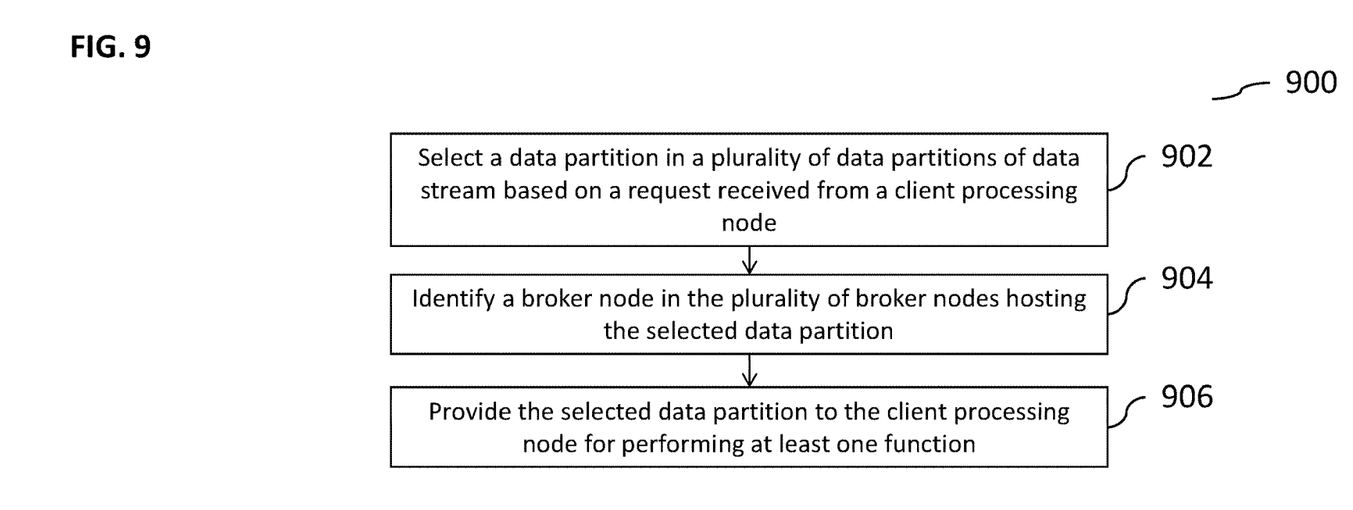
FIG. 9 illustrates an exemplary method, according to some implementations of the current subject matter.

FIG. 9 illustrates an exemplary method 900 for performing error handling/resolution in computing systems, according to some implementations of the current subject matter. At 902, a data partition in a plurality of data partitions of data stream can be selected based on a request received from a client processing node. The client can be a reader or a writer (as shown in FIG. 3). The plurality of data partitions can be distributed among a plurality of broker nodes (e.g., broker nodes 304, 306 shown in FIG. 3) in a distributed messaging system (e.g., distributed messaging system 302 shown in FIG. 3). At 904, a broker node in the plurality of broker nodes hosting the selected data partition can be identified. As shown in FIGS. 6 and 7, the correct broker node 606 or 706 can be identified depending on whether the request is to write to the partition (broker node 606) or to read from the partition (broker node 706). At 906, the identified broker node (e.g., broker node 606, 706) can provide the selected data partition to the client processing node for performing at least one function (e.g., reading from the partition or writing to the partition).

In some implementations, the current subject matter can include one or more of the following optional features. The plurality of data partitions in the data stream can be arranged using a rooted acyclic directed graph (as shown in FIG. 4).

In some implementations, the client processing node can includes at least one of the following: a reader processing node and a writer processing node. The reader processing node can read data from the selected data partition. The writer processing node can write data to the selected data partition.

In some implementations, the identification of the broker node can include communicating the request received from the client processing node to any broker node (e.g., broker nodes 604, 704 shown in FIGS. 6, 7, respectively) in the plurality of broker nodes, determining that the broker node receiving the request does not host the selected data partition, and identifying the broker node hosting the selected data partition.

In some implementations, providing of the selected partition can include providing, by the identified broker node, the selected data partition, where the selected data partition is an existing data partition in the data stream. Alternatively, the identified broker node can create a new data partition and provide the created data partition to the client processing node for performing the at least one function.

In some implementations, the function can include at least one of the following: reading data from the selected data partition and writing data to the selected data partition. In some implementations, data can be read from the selected data partition in accordance with an order in which data was written to the selected data partition.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   selecting, based on a request received from a client node, a data partition in a plurality of data partitions of a data stream, the request identifying the data stream, the plurality of data partitions arranged using a rooted acyclic directed graph and distributed among a plurality of broker nodes in a distributed messaging system, the selected data partition based further on a first distance between a root partition of the acyclic directed graph and the selected data partition being greater than a second distance between the root partition and a previously selected partition of the data stream, wherein the first distance and the second distance are positive integer values greater than zero;

identifying a broker node in the plurality of broker nodes hosting the selected data partition; and providing, by the identified broker node, the selected data partition to the client node for performing at least one function;

wherein at least one of the selecting, the identifying, and the providing is performed using at least one processor of at least one computing system.

2. The method according to claim 1, wherein the client node includes at least one of the following: a reader node and a writer node;
the reader node reads data from the selected data partition;
the writer node writes data to the selected data partition.

3. The method according to claim 1, wherein the identifying includes
communicating the request received from the client node to any broker node in the plurality of broker nodes;
determining that the broker node receiving the request does not host the selected data partition; and
identifying the broker node hosting the selected data partition.

4. The method according to claim 1, wherein the providing includes:
determining whether the selected data partition is an existing data partition in the data stream,
creating, by the identified broker node and in response to the determining, a first data partition; and
providing the first data partition or the existing data partition to the client node.

5. The method according to claim 1, wherein the at least one function includes at least one of the following: reading data from the selected data partition and writing data to the selected data partition.

6. The method according to claim 5, wherein data is read from the selected data partition in accordance with an order in which data was written to the selected data partition.

7. A system comprising:
at least one programmable processor; and
a machine-readable medium storing instructions that, when executed by the at least one programmable processor, cause the at least one programmable processor to perform operations comprising:
selecting, based on a request received from a client node, a data partition in a plurality of data partitions of a data stream, the request identifying the data stream, the plurality of data partitions arranged using a rooted acyclic directed graph and distributed among a plurality of broker nodes in a distributed messaging system, the selected data partition based further on a first distance between a root partition of the acyclic directed graph and the selected data partition being greater than a second distance between the root partition and a previously selected partition of the data stream, wherein the first distance and the second distance are positive integer values greater than zero;
identifying a broker node in the plurality of broker nodes hosting the selected data partition; and
providing, by the identified broker node, the selected data partition to the client node for performing at least one function.

8. The system according to claim 7, wherein the client node includes at least one of the following: a reader node and a writer node;
the reader node reads data from the selected data partition;
the writer node writes data to the selected data partition.

9. The system according to claim 7, wherein the identifying includes
communicating the request received from the client node to any broker node in the plurality of broker nodes;
determining that the broker node receiving the request does not host the selected data partition; and
identifying the broker node hosting the selected data partition.

10. The system according to claim 7, wherein the providing includes:
determining whether the selected data partition is an existing data partition in the data stream,
creating, by the identified broker node and in response to the determining, a first data partition; and
providing the first data partition or the existing data partition to the client node.

11. The system according to claim 7, wherein the at least one function includes at least one of the following: reading data from the selected data partition and writing data to the selected data partition.

12. The system according to claim 11, wherein data is read from the selected data partition in accordance with an order in which data was written to the selected data partition.

13. A computer program product comprising a non-transitory machine-readable medium storing instructions that, when executed by at least one programmable processor, cause the at least one programmable processor to perform operations comprising:
selecting, based on a request received from a client node, a data partition in a plurality of data partitions of a data stream, the request identifying the data stream, the plurality of data partitions arranged using a rooted acyclic directed graph and distributed among a plurality of broker nodes in a distributed messaging system, the selected data partition based further on a first distance between a root partition of the acyclic directed graph and the selected data partition being greater than a second distance between the root partition and a previously selected partition of the data stream, wherein the first distance and the second distance are positive integer values greater than zero;
identifying a broker node in the plurality of broker nodes hosting the selected data partition; and
providing, by the identified broker node, the selected data partition to the client node for performing at least one function.

14. The computer program product according to claim 13, wherein the client node includes at least one of the following: a reader node and a writer node;
the reader node reads data from the selected data partition;
the writer node writes data to the selected data partition.

15. The computer program product according to claim 13, wherein the identifying includes
communicating the request received from the client node to any broker node in the plurality of broker nodes;
determining that the broker node receiving the request does not host the selected data partition; and
identifying the broker node hosting the selected data partition.

16. The computer program product according to claim 13, wherein the providing includes:
- determining whether the selected data partition is an existing data partition in the data stream,
- creating, by the identified broker node and in response to the determining, a first data partition; and
- providing the first data partition or the existing data partition to the client node.

17. The computer program product according to claim 13, wherein the at least one function includes at least one of the following: reading data from the selected data partition and writing data to the selected data partition;
- wherein data is read from the selected data partition in accordance with an order in which data was written to the selected data partition.

\* \* \* \* \*